Sept. 4, 1951

V. K. ZWORYKIN

COLOR TELEVISION

Filed April 4, 1947

2,566,713

INVENTOR.
VLADIMIR K. ZWORYKIN
BY W. S. Grover
ATTORNEYS.

Patented Sept. 4, 1951 2,566,713

UNITED STATES PATENT OFFICE 2,566,713

COLOR TELEVISION

Vladimir K. Zworykin, Princeton, N. J., assignor to Radio Corporation of America, a corporation of Delaware Application April 4, 1947, Serial No. 739,503

7 Claims. (Cl. 178—5.4)

The present invention relates to color television and more particularly, but not necessarily exclusively, to a color television system in which images in substantially natural color are produced by electronic means.

In accordance with this invention colored images formed sequentially by cyclically altering the effective velocity of the scanning cathode ray beam of a cathode ray image producing tube in the region of the target area of an image producing device. In an important aspect of the invention colored images are produced for observation solely by the action of an electron current without necessity for resorting to mechanical and optical devices such as light filters, color wheels or drums or the like.

The primary object of the present invention is to provide a novel electronic color television system capable of producing an image of a view or object brilliantly and in substantially natural colors.

Another object is to provide a novel color television system which operates solely by electronic action.

A further object of the present invention is to provide a novel electron beam target for an image producing tube.

A still further object is to provide a novel color television system having means for sequentially controlling the operation of an image producing device.

A still further object is to provide a novel arrangement for projecting television images in substantially their natural colors.

Other and more specific objects of the invention will become apparent from a consideration of the following specification and claims in connection with the accompanying drawings illustrating the invention, in which:

Figures 1, 2, 3, 4, 5:
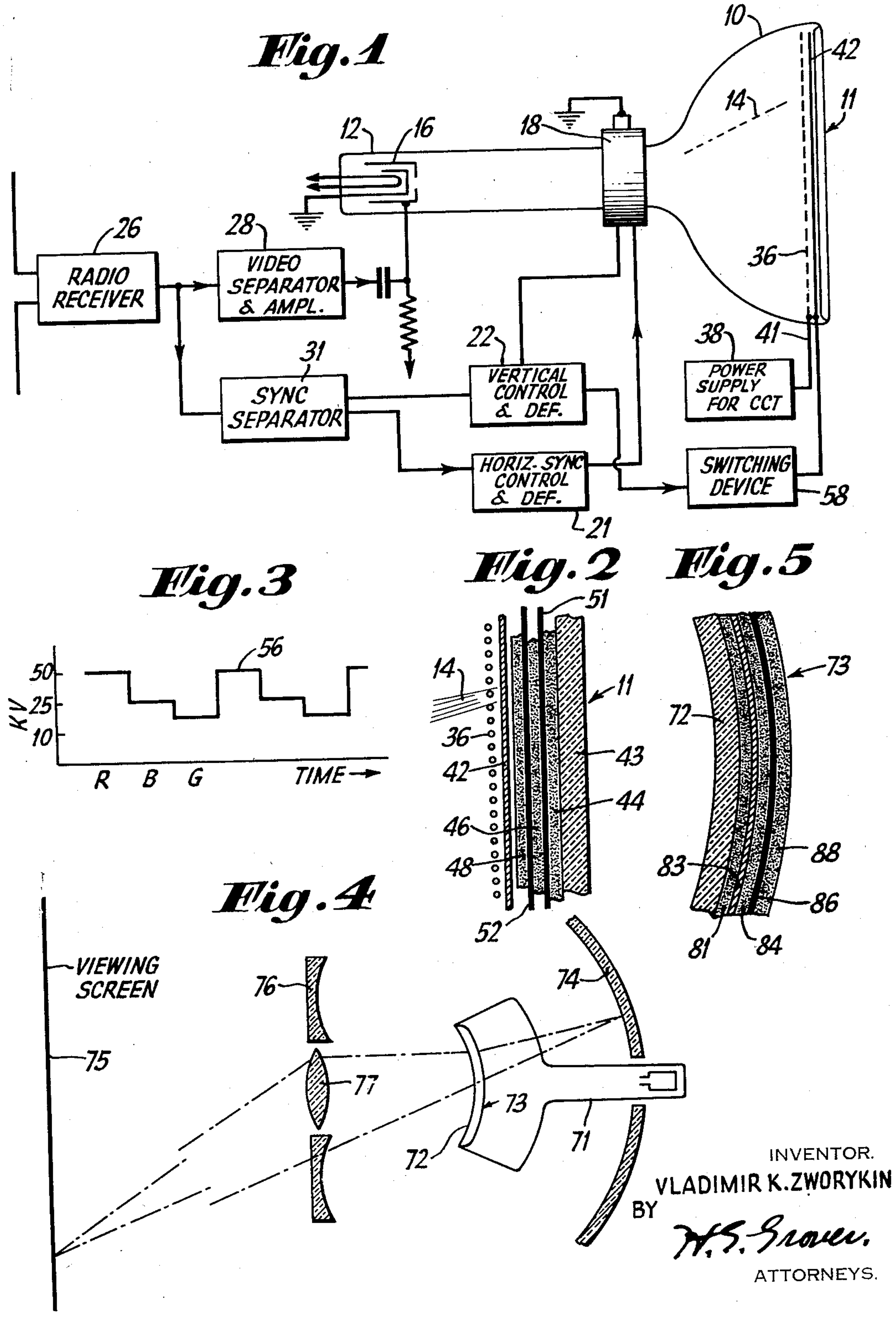
Fig. 1 is a diagrammatic showing of a system embodying the invention for producing an image in substantially the natural colors of the original.
Fig. 2 is a fragmentary detail view to an enlarged scale of the target area of the image producing device included in Fig. 1.
Fig. 3 is a curve showing voltage relationships used in explaining the invention.
Fig. 4 is a diagrammatic view of a modified system in accordance with the invention.
Fig. 5 is a fragmentary detail view to an enlarged scale of the image producing device of Fig. 4.

In Fig. 1 there is shown a television receiving apparatus having an image producing device in the form of a cathode ray tube 10 provided with the novel target arrangement of this invention, indicated generally by reference character 11, for producing images in color in accordance with the invention. The tube 10 is equipped with a cathode ray gun structure 12 for developing a beam of electrons shown conventionally and indicated by reference character 14 in Figs. 1 and 2. The gun 12 is provided with a control electrode or a grid 16 for modulating the beam 14 which is focused within the depth or thickness of the target device 11. A horizontal (line) and vertical (field) deflecting coil yoke assembly is indicated generally by reference character 18, and the horizontal and vertical deflecting coil assemblies therein are connected to horizontal and vertical deflection generators 21 and 22 respectively to produce scanning action of the beam 14 in a manner which is by now well known. This scanning action is to be maintained substantially constant in area in accordance with the invention in the manner later to be described in connection with Fig. 2 of the drawings. A television receiver arranged generally in this manner is shown in United States reissue patent to Carlson, Re. No. 20,700 granted April 19, 1938. The deflection and control circuits shown and described therein and in a United States patent to Tolson et al. No. 2,101,520, granted December 17, 1937, or in the United States patent to Vance, No. 2,137,039, granted November 15, 1938, may be employed in connection with the tube 10 of this invention. Synchronization may be maintained in accordance with the arrangement disclosed and claimed in the U. S. patent to Wright et al., No. 2,460,112. The various electrodes of the electron gun 16 (not all shown) of the tube 10 are to be supplied as usual with suitable operating potentials. This may be done as shown in the Bedford patent referred to above.

A radio receiver 26, suitable for the reception of television signals from a more or less distant transmitter and equipped with the usual selective circuits, amplifiers and a demodulating device is connected, as shown, so that its output is furnished to a video signal separator and amplifier 28. The demodulated signal from the radio receiver 26 will provide sets of video signals sequentially representing the scanning of an original in several primary colors. In the illustrative arrangement, scanning of the original in any three selected primary or component colors, such as the additive red, blue and green is assumed for purposes of illustration. Any three colors may be selected so long as they are widely separated spectrally in the I. C. I. color triangle and no two of them can be added together to produce the third but all add together to produce white.

Transmitters for scanning images and objects in this manner are known and may comprise separate scanning devices, one for each color, operating synchronously; or the original view or object may be scanned sequentially in the manner shown in United States Patent No. 2,413,075 granted to O. H. Schade, December 24, 1946, or U. S. Patent No. 2,297,524, to E. I. Anderson, granted September 29, 1942.

The demodulated signal from the radio receiver 26 is applied to a sync separator 31 which separates the horizontal (line) and the vertical (field) sync pulses normally present in the demodulated television signal so that these may be applied to the horizontal and vertical synchronizing controls 21 and 22 respectively. This general arrangement for synchronizing a receiver is commonly used in the art and, for instance is shown in detail in the Carlson reissue patent referred to above and has been described herein merely for the sake of completeness of the disclosure.

The cathode ray tube 10 includes an electrode 36 (Fig. 1 and Fig. 2) which may be in the form of a fine wire grid and is preferably placed outside of the focus of the beam 14. This electrode 36 may be of the type shown in United States patent to Beers, No. 2,385,563, granted September 25, 1945, for example. The effect of the grid 36 on the beam at its focal point may be substantially eliminated as described in the Beers patent. It should be understood, however, that the electrode 36 may be in the form of a metallic film or the like which is not impervious to the electron stream of the beam. In the present invention this grid 36 is in communication with a source of relatively high positive potential, such as an appropriate terminal on the power supply unit 38 for the cathode ray tube 10. A connection to the power supply unit is shown diagrammatically and is indicated at 41.

In accordance with the invention, the velocity of the beam 14 in the region of the target 11 is to be altered by an electrode 42 (Figs. 1 and 2). In order to maintain the image size constant the beam stiffness and hence the deflection sensitivity is maintained constant by the grid 36 just described. This grid maintains a constant stiffness of the beam irrespective of voltage changes on the electrode 42.

Referring to Fig. 2, the transparent end of the envelope of the cathode ray tube is indicated by reference character 43. The target or screen comprises three continuous fluorescent films built in such a manner that each one is excited only by the electron beam 14 when it has a predetermined and selected velocity. An intermediate step occurs when two of these films are excited simultaneously.

The fluorescent film 44 is preferably transparent and for illustration may be assumed to produce red light emission. The film 46 is also preferably transparent and may be assumed to produce blue light emission. The film 48 may be opaque and assumed to produce green light emission. An alternative method of producing green is by making the film 48 yellow and penetrating both 48 and 46. There is a transparent barrier film 51 and 52 between each fluorescent film. These barrier layers improve the color change vs. voltage change characteristics of the screen. The films 51 and 52 are of transparent material such as, for instance, evaporated silica.

The thickness of each of the fluorescent films 44, 46 and 48 is such that when the scanning beam 14 does not exceed a certain velocity, for example 10,000 volts, it affects only the first green light producing film 48. When the scanning beam velocity is increased by a suitable margin, for example to 25,000 volts, most of its energy will be absorbed in the second or blue light producing layer 46 of the fluorescent material. Finally, when the scanning beam velocity is again increased by a suitable margin, for example to 50,000 volts, it will penetrate both the green light producing film 48 and the blue light producing film 46 without losing an appreciable amount of its energy and it will be absorbed completely in the film section 44 whereat red light is developed.

The velocity of the scanning beam 14 is altered in accordance with the invention by applying the desired successive voltages to the electrode 42, the voltage values being indicated diagrammatically on Fig. 3 of the drawings by the graph 56. In sequential color television systems, the order of exhibition of the colors is generally red, blue and green. The stepped voltages represented by 56 on Fig. 3 may be obtained from an electronic switching device 58 operating under the control of the vertical control and deflection device 22. The switching device 58 may be of any type known to the art which will add pulses of voltage to produce the voltage steps shown in Fig. 3. The arrangement of the United States reissue patent Re. 22,672 granted to C. C. Shumard on August 28, 1945, may be used as an electronic switch. The scale of ordinates in this figure may represent kilovolts and the range of the stepped wave 56 may be, for example, as stated above, between 10 kilovolts and 50 kilovolts. Application of 50 kilovolts to the electrode 42 excites the screen 44 which produces red fluorescence. Application of 25 kilovolts to the screen 42 excites the film 46 to blue fluorescence. With the above suggested arrangement wherein the screen 48 is designed to give yellow illumination, then when approximately 17.5 kilovolts is applied to the electrode 42, both the film 48 to produce blue light and the film 48 (modified to produce yellow light) respectively, are active to produce green illumination. It will be understood that rather than having three successive frames as shown in Fig. 3 any known three color sequential interlace scheme may be followed by proper timing of the voltages. The scale of the graph of Fig. 3 is illustrative only and the selected values will depend upon the constants of the gun 12, the voltage applied to the grid 36, and other factors, which for a given installation, may be predicted. Also, it will be understood that the magnitudes referred to are concerned only with final beam velocity and not, necessarily, to the output measured in volts of the device 58.

The composition and formation of the fluorescent screens are not, per se, a part of the present invention. The film 46 may be of zinc sulphide. The film 48 may be of willemite or of zinc cadium sulphide. The film 44 may be composed of zinc sulphide and cadium sulphide with a trace of silver. The switching device 58, it will be understood by those skilled in the art, is to operate in phase with the color wheel or other filter device employed at the transmitter. This may be accomplished in any suitable manner, for example, as shown in U. S. Patent No. 2,378,746 granted to George L. Beers on July 19, 1945, or in U. S. Patent No. 2,309,506 granted to P. J.

Herbst on January 26, 1943. A manually operable arrangement for the purpose is shown in the U. S. patent to F. J. Somers, No. 2,423,946. Phasing may be accomplished, for example, by a switch in the connection from the source of vertical and sync signals to the switching devices.

Fig. 4 of the drawings illustrates a modification of the invention which requires only one transparent fluorescent film and two opaque fluorescent films. Referring to Fig. 4 there is shown an image producing cathode ray tube 71 which may be generally constructed as disclosed in the United States patent to Epstein et al., No. 2,305,855, granted December 22, 1942. It is preferred, however, that the tube 71 be constructed of glass so that it presents a curved transparent portion 72 which is provided, in accordance with the invention, with the modified target arrangement indicated in its entirety by reference character 73. A reflective optical system is embodied in Fig. 4 comprising a spherical mirror 74 and a spherical abberation correcting plate 76, this type of optical system being described in United States patent to Landis, No. 2,273,801, issued February 17, 1942. Successive luminous images which appear on the inside of the device 73 are projected onto a viewing screen 76 in a manner fully explained in the Landis patent.

The luminous image which is transmitted through the transparent curve face 72 of the tube is imaged by a refracting lens 77 designed to superimpose the two images on each other on the viewing screen 76.

Referring to Fig. 5, a transparent film 81 which produces red illumination when activated is deposited on the glass 72. A transparent barrier layer 83 is deposited on the film 81 following which an opaque blue light producing fluorescent film 84 is deposited. Reference character 86 indicates a continuous metallic film on which is deposited the opaque green light producing phosphor film 88.

In operation of the modification of Fig. 4, it will be understood that the general system of Fig. 1 will be employed including a grid similar to the grid 36. The metal film 86 functions in the manner of the metallic electrode 42 of Fig. 1. The successive voltages are applied to the film 86 to provide the beam velocities which produce the color sequence of Fig. 1. For example, the highest beam velocity will produce red illumination. A lower beam velocity will produce blue illumination and a velocity which is slightly lower than this will produce green by reason of concurrent activity of the blue and yellow fluorescent layers. In this last instance these colors will be superimposed on the screen.

It will be understood that in the system og Fig. 1 as shown, and as it may be modified in connection with the disclosure of Fig. 4, compensation may be introduced into the scanning circuit itself to overcome changes in the amplitude of scanning when the velocity of the beam is changed

Having now described the invention, what is claimed and desired to be secured by Letters Patent is the following:

1. A color television system comprising a cathode ray tube, cathode ray beam producing structure in said tube, a multi-layer fluorescent target in said tube to be impinged upon by said beam, said multi-layer target having a layer of substantially green color light producing material, a layer of substantially blue color light producing material, and a layer of substantially red color light producing material, a non-fluorescent member positioned between each of said layers of said light producing materials, an electrode composed of an electron pervious metallic sheet disposed in the path of the cathode ray beam for altering its velocity in the region of the target, and means to apply voltages having values differing sequentially in steps to said electrode.

2. A color television system comprising a cathode ray tube, a cathode ray beam producing structure in said tube, a fluorescent screen in said tube comprising a plurality of different colored layers a spacer positioned between each of said different colored layers, each layer being capable of producing light radiation of only one different distinctive color upon activation by a cathode ray beam of the same velocity, an electrode substantially coextensive with said multi-layer screen and disposed in the path of said beam for altering the velocity of said beam in the vicinity of the screen, and means sequentially to apply voltages having different values to said electrode to produce characteristic and substantially separate activation of each layer sequentially.

3. A receiver for a color television system comprising a cathode ray tube having a multi-layer fluorescent target, each layer being capable of producing light radiation of a different distinctive color upon penetration by a cathode ray beam of a given velocity, a viewing screen, a spherical mirror disposed with respect to said tube to receive light produced by one of said layers, an aspheric correcting plate disposed in the path of light rays proceeding from said mirror to said screen, and a lens for receiving light produced by other layers of said fluorescent screen, said lens serving to image said light rays upon said screen in register with the rays from said correcting plate.

4. In a color television receiver of the projection type, a cathode ray tube having a bulb structure providing an exposed light transmitting concave face, a light transmitting fluorescent layer on the convex side of the exposed concave face, a second fluorescent layer disposed on said first fluorescent layer, a material opaque to light disposed on said second fluorescent layer, a third fluorescent layer disposed on said opaque material, and said tube having a transparent wall at the rear of said bulb structure to transmit light radiation emitted from said third fluorescent layer.

5. A receiver for a color television system comprising a cathode ray tube having an enlarged bulb structure provided with a transparent end exposed to the front of said tube and a transparent back, a multi-layer fluorescent target on the inside of said end, certain of said layers being capable of producing light radiation of a distinctive color upon activation by a cathode ray beam of a given velocity, a viewing screen, a spherical mirror disposed with respect to the rear of said bulb structure to receive light produced by only the one of said layers nearest said spherical mirror, an aspheric correcting plate disposed in the path of light rays proceeding from said mirror to said screen, a lens for receiving light produced by other layers of said fluorescent screen, said lens serving to image said light rays upon said screen in register with the rays from said correcting plate.

6. A color television system comprising a cathode ray tube, cathode ray beam producing structure in said tube, a multi-layer target in said tube to be impinged upon by said beam, said multi-layer target having layers of different component color light producing properties, each of said layers being spaced from each other by a non-fluorescent material, and an electrode disposed in the path of the cathode ray beam for altering its velocity.

7. In a color television receiver of the projection type, a cathode ray tube having a bulb structure providing an exposed light transmitting surface, a light emitting fluorescent layer on said surface, a second fluorescent layer disposed on said first fluorescent layer, a third fluorescent layer disposed on said second fluorescent layer, each of said layers having different color fluorescent properties, a material opaque to light disposed between two of said fluorescent layers, and said tube having a transparent wall at the rear of said bulb structure to transmit light radiation emitted from at least one of said fluorescent layers.

VLADIMIR K. ZWORYKIN.

REFERENCES CITED

The following references are of record in the file of this patent:

UNITED STATES PATENTS

| Number | Name | Date |
|---|---|---|
| 2,200,285 | Lorenzen | May 14, 1940 |
| 2,273,801 | Landis | Feb. 17, 1942 |
| 2,305,855 | Epstein | Dec. 22, 1942 |
| 2,307,188 | Bedford | Jan. 5, 1943 |
| 2,310,863 | Leverenz | Feb. 9, 1943 |
| 2,343,825 | Wilson | Mar. 7, 1944 |
| 2,423,830 | Fonda | July 15, 1947 |
| 2,446,764 | Henderson | Aug. 10, 1948 |
| 2,455,710 | Szegho | Dec. 7, 1948 |
| 2,461,515 | Bronwell | Feb. 15, 1949 |